US012259251B2

(12) United States Patent
Aggoune et al.

(10) Patent No.: US 12,259,251 B2
(45) Date of Patent: Mar. 25, 2025

(54) SYSTEM AND METHOD FOR CONTROLLING VEHICLE PROPULSION

(71) Applicant: BorgWarner US Technologies LLC, Wilmington, DE (US)

(72) Inventors: Karim Aggoune, Auburn Hills, MI (US); Gerard W. Malaczynski, Bloomfield Hills, MI (US); Claude P. Poull, Houdemont (BE)

(73) Assignee: BorgWarner US Technologies LLC, Wilmington, DE (US)

( * ) Notice: Subject to any disclaimer, the term of this patent is extended or adjusted under 35 U.S.C. 154(b) by 234 days.

(21) Appl. No.: 17/464,596

(22) Filed: Sep. 1, 2021

(65) Prior Publication Data

US 2023/0061782 A1 Mar. 2, 2023

(51) Int. Cl.
*G01C 21/34* (2006.01)
*B60W 30/14* (2006.01)
(Continued)

(52) U.S. Cl.
CPC ....... *G01C 21/3469* (2013.01); *B60W 30/143* (2013.01); *B60W 40/076* (2013.01);
(Continued)

(58) Field of Classification Search
CPC ............ G01C 21/3469; B60W 30/143; B60W 40/076; B60W 2510/083; B60W 2552/15;
(Continued)

(56) References Cited

U.S. PATENT DOCUMENTS 3,347,092 A * 10/1967 Stutson .................. G01F 9/001
701/123
8,063,755 B2 * 11/2011 Eikelenberg .......... B60W 50/14
340/439
(Continued)

FOREIGN PATENT DOCUMENTS

DE        19620706 C1 *  7/1997  ............. G05B 19/19
DE    102012019609 A1 *  4/2014  ........... G01F 15/024

OTHER PUBLICATIONS

Matthew Sleight, "Regression: Polynomial Lines of Best Fit in Energy Consumption Analysis", Feb. 9, 2016 (Year: 2016).*
(Continued)

*Primary Examiner* — Marc Burgess
*Assistant Examiner* — Merritt E Levy
(74) *Attorney, Agent, or Firm* — Dickinson Wright PLLC

(57) ABSTRACT

A method for estimating energy consumption of a vehicle includes receiving, from a remotely located computing device, standardized energy consumption data corresponding to at least one other vehicle, the standardized energy consumption data corresponding to energy consumption of the at least one other vehicle as a function of speed. The method further includes generating a scaling factor by comparing the energy consumption data corresponding to the energy consumption of the vehicle as a function of speed with the standardized energy consumption data. The method further includes scaling the standardized energy consumption data to generate a profile of the energy consumption efficiency of the vehicle. The method further includes generating a signal to selectively adjust at least one of a speed of the vehicle, at least one route characteristic of a portion of a route being traversed by the vehicle, and a torque demand of the vehicle.

11 Claims, 6 Drawing Sheets

(51) Int. Cl.
*B60W 40/076* (2012.01)
*G07C 5/00* (2006.01)
*G07C 5/08* (2006.01)

(52) U.S. Cl.
CPC ............ *G07C 5/008* (2013.01); *G07C 5/0808* (2013.01); *B60W 2510/083* (2013.01); *B60W 2552/15* (2020.02); *B60W 2556/45* (2020.02)

(58) Field of Classification Search
CPC .. B60W 2556/45; G07C 5/008; G07C 5/0808
USPC ......................................................... 701/123
See application file for complete search history.

(56) References Cited

U.S. PATENT DOCUMENTS

| | | | |
|---|---|---|---|
| 9,815,470 B2 | 11/2017 | Luther et al. | |
| 10,565,805 B2 | 2/2020 | Brenner | |
| 2010/0198478 A1* | 8/2010 | Shin | B60W 10/06 701/96 |
| 2011/0160990 A1* | 6/2011 | Mineta | G01C 21/3469 701/123 |
| 2013/0090790 A1* | 4/2013 | Yuen | G07C 5/008 701/123 |
| 2014/0278823 A1* | 9/2014 | de Oliveira | G07C 5/008 705/7.38 |
| 2015/0329102 A1* | 11/2015 | Yoshikawa | B60W 10/06 701/1 |
| 2016/0123752 A1 | 5/2016 | Kandula et al. | |
| 2017/0008468 A1 | 1/2017 | Lindhuber et al. | |
| 2017/0287237 A1* | 10/2017 | Koenig | G07C 5/008 |
| 2018/0244280 A1* | 8/2018 | Miro-Padovani | B60W 20/12 |
| 2019/0035178 A1* | 1/2019 | Kim | G08G 5/0013 |
| 2019/0164451 A1 | 5/2019 | Gaither et al. | |
| 2019/0221055 A1* | 7/2019 | Chasse | G07C 5/0841 |
| 2019/0344777 A1* | 11/2019 | Ourabah | B60W 10/06 |
| 2020/0216067 A1* | 7/2020 | Olin | B60W 20/15 |
| 2020/0298866 A1* | 9/2020 | Flärdh | B60W 30/188 |
| 2020/0302357 A1* | 9/2020 | Longin | H04W 4/024 |
| 2021/0291803 A1* | 9/2021 | Gesang | B60W 10/08 |
| 2022/0032896 A1* | 2/2022 | Ourabah | B60W 10/26 |
| 2022/0219691 A1* | 7/2022 | Maleki | G06F 11/079 |

OTHER PUBLICATIONS

Shankar, R. and Marco, J. (2013), Method for estimating the energy consumption of electric vehicles and plug-in hybrid electric vehicles under real-world driving conditions. IET Intell. Transp. Syst., 7: 138-150. https://doi.org/10.1049/iet-its.2012.0114 (Year: 2013).*

He, Xiaozheng (Sean) & Wu, Xinkai. (2018). Eco-driving advisory strategies for a platoon of mixed gasoline and electric vehicles in a connected vehicle system. Transportation Research Part D Transport and Environment. 63. 907-922. 10.1016/j.trd.2018.07.014. (Year: 2018).*

Ray Galvin, "Energy consumption effects of speed and acceleration in electric vehicles: Laboratory case studies and implications for drivers and policymakers", Transportation Research Part D: Transport and Environment, vol. 53, 2017, pp. 234-248 (Year: 2017).*

Warren Vaz, Arup K.R. Nandi, Robert G. Landers, Umit O. Koylu, Electric vehicle range prediction for constant speed trip using multi-objective optimization, Journal of Power Sources, vol. 275, 2015, pp. 436-446 (Year: 2015).*

John Thomas et al., Fuel Consumption Sensitivity of Conventional and Hybrid Electric Light-Duty Gasoline Vehicles to Driving Style, SAE International, Aug. 11, 2017, vol. 10, Issue 3.

* cited by examiner

SYSTEM AND METHOD FOR CONTROLLING VEHICLE PROPULSION

GOVERNMENT LICENSE RIGHTS

This invention was made with government support under the DE-AR0000794 contract awarded by United States Department of Energy, Advanced Research Projects Agency (ARPA-E). The government has certain rights in the invention.

TECHNICAL FIELD

This disclosure relates to vehicle propulsion control, and in particular to systems and methods for improving vehicle energy efficiency through vehicle propulsion control.

BACKGROUND

Vehicles, such as cars, trucks, sport utility vehicles, crossovers, mini-vans, or other suitable vehicles, may include various automatic vehicle propulsion control systems, such as cruise control, adaptive cruise control, and the like. Typically, such systems receive input from a driver that indicates a desired vehicle speed. The automatic vehicle propulsion control systems typically interact with various vehicle components, such as a throttle, brake system, and the like, to achieve the desired speed.

The automatic vehicle propulsion control systems may be capable of maintaining the desired vehicle speed by adjusting a torque demand provided to various vehicle components, such is the case with cruise control, or may be capable of maintaining the desired vehicle speed and adjusting the vehicle speed to improve momentary energy efficiency. However, such systems do not account for changes in gradients along a route that require increased torque demand. In addition, such systems are not capable of meeting energy consumption targets for an overall route between a starting location and a travel destination.

SUMMARY

This disclosure relates generally to vehicle propulsion control systems and methods.

An aspect of the disclosed embodiments is a method for estimating energy consumption of a vehicle. The method includes receiving, from a remotely located computing device, standardized energy consumption data corresponding to at least one other vehicle, the standardized energy consumption data corresponding to energy consumption of the at least one other vehicle as a function of speed. The method further includes generating a scaling factor by comparing the energy consumption data corresponding to the energy consumption of the vehicle as a function of speed with the standardized energy consumption data. The method further includes scaling the standardized energy consumption data to generate a profile of the energy consumption efficiency of the vehicle. The method further includes generating a signal to selectively adjust of at least one of a speed of the vehicle, at least one route characteristic of a portion of a route being traversed by the vehicle, and a torque demand of the vehicle.

Another aspect of the disclosed embodiments is an apparatus for estimating energy consumption of a vehicle. The apparatus includes a memory and a processor. The memory includes instructions executable by the processor to: receive, from a remotely located computing device, standardized energy consumption data corresponding to at least one other vehicle, the standardized energy consumption data corresponding to energy consumption of the at least one other vehicle as a function of speed; generate a scaling factor by comparing the energy consumption data corresponding to the energy consumption of the vehicle as a function of speed with the standardized energy consumption data; scale the standardized energy consumption data to generate a profile of the energy consumption efficiency of the vehicle; and generate a signal to selectively adjust at least one of a speed of the vehicle, at least one route characteristic of a portion of a route being traversed by the vehicle, and a torque demand of the vehicle.

Another aspect of the disclosed embodiments is a non-transitory computer-readable storage medium. The non-transitory computer-readable medium includes executable instructions that, when executed by a processor, facilitate performance of operations, comprising: receiving, from a remotely located computing device, standardized energy consumption data corresponding to at least one other vehicle, the standardized energy consumption data corresponding to energy consumption of the at least one other vehicle as a function of speed; generating a scaling factor by comparing the energy consumption data corresponding to the energy consumption of the vehicle as a function of speed with the standardized energy consumption data; scaling the standardized energy consumption data to generate a profile of the energy consumption efficiency of the vehicle; and generating a signal to selectively adjust at least one of a speed of the vehicle, at least one route characteristic of a portion of a route being traversed by the vehicle, and a torque demand of the vehicle.

These and other aspects of the present disclosure are provided in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
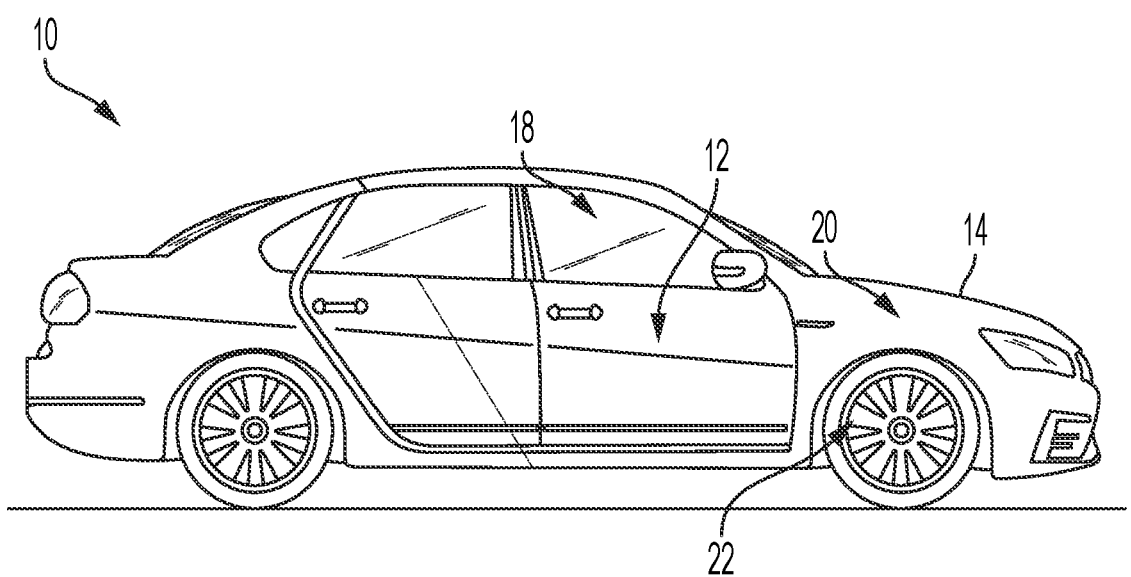
FIG. 1 generally illustrates a vehicle according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, cross-overs, mini-vans, or other suitable vehicles, may include various automatic vehicle propulsion control systems that may provide a level of automation for the vehicle. For example, a vehicle may include cruise control, adaptive cruise control, automatic braking, a fully autonomous vehicle control system, or any suitable vehicle propulsion control system or a combination thereof. Typically, systems such as cruise control and adaptive cruise control receive input from a driver that indicates a desired vehicle speed. In the case of a fully autonomous vehicle, the autonomous vehicle control systems may determine a vehicle speed based on posted speed limits and a variety of safety systems and protocols. The automatic vehicle propulsion control systems typically interact with various vehicle components, such as a throttle, brake system, and the like, to achieve the desired speed.

While automatic vehicle propulsion control systems may be capable of maintaining the desired vehicle speed by adjusting a torque demand provided to various vehicle components, such is the case with cruise control, or may be capable of maintaining the desired vehicle speed and adjusting the vehicle speed to improve momentary energy efficiency.

Existing propulsion system inverter control is based on responding to driver desired torque commands based on driver input via the accelerator pedal or similar device to convey driver intent. In some cases, a cruise control or adaptive cruise control or other similar system provides a surrogate for driver desired propulsion system torque. The vehicle propulsion controller then responds to and delivers this desired torque to produce the vehicle speed that the driver is expecting. This control strategy applies to hybrid and electric vehicles as well as internal combustion engine vehicles. The propulsion control system commands a desired level of electric machine torque based on torque control and/or torque split algorithms and calibration, subject to propulsion system limits, irrespective of the thermal state of the propulsion system inverter.

There is substantial cost and environmentally-driven pressure to develop solutions leading to more energy efficient vehicles. This is being achieved by continuous improvement of the power train system, but also, can be delivered by a "conscious" driving. The enhanced, more energy efficient driving can be achieved by providing the driver with the information of the projected energy efficiency of the vehicle along the planned driving path. This, in practice, among others, is defined by the characteristic of a specific vehicle powertrain performance.

However, such systems do not account for changes in gradients along a route that require increased torque demand. In addition, such systems are not capable of meeting energy consumption targets for an overall route between a starting location and a travel destination. Accordingly, systems and methods, such as those disclosed herein, that provide vehicle propulsion control in order to achieve an optimum energy consumption over a route or at least one route segment may be desirable.

In some embodiments, the systems and methods described herein may be configured to generate a recommendation regarding optimum speed for energy economy that can be delivered via a mobile device such as a smartphone or tablet having access to the global positioning system. For example, vehicle consumption characteristics of a specific vehicle can be received if known. Standardized homologation tests can be accessed and received (e.g., via a remote computing device or cloud) if the vehicle VIN number is known.

In some embodiments, the systems and methods described herein may be configured to receive the cycle data, full dependence of energy consumption of a specific vehicle versus vehicle velocity and load, which may be defined at least partially by gravitational forces which can be estimated with the assistance of the Global Positioning System. Such systems and methods offer chances for energy economy improvement to vehicles already on the road.

In some embodiments, the systems and methods described herein may be configured to generate a parabolic approximation of energy consumption characteristic from a third party source such as a Combined City and Highway standard EPA tests. For example, the systems and methods described herein may receive EPA Combined City and Highway energy consumption of an arbitrary selected vehicle. The EPA reported results of the vehicle will serve as a reference for calculation of energy consumption characteristic of any vehicle belonging to the same class. The EPA data may be modeled together with a parabolic fit of dyno-based experimental results, testing the energy consumption at various steady state velocities of the same vehicle.

In some embodiments, the systems and methods described herein may be configured to generate a formula which would allow us to extrapolate from two data points given as the result of EPA tests, the parabola identical to that represented by fitting experimental results. In other words, finding one or more scaling factors which when applied to Combined City and Highway points would relocate that points to the parabola line generated by fitting our dyno experiment of that specific vehicle. The EPA-reported results may, in reality, do not represent energy consumption at any specific velocity of the vehicle. Instead, these two points represent energy consumption of the vehicle driven with two different standard-specified velocity patterns. Therefore, the systems and methods herein may assume that some weight factors need to be applied to translate the information addressing energy consumption of both Combined City and Highway runs into data points representing energy consumption of the vehicle driven at constant speed of 21.31 mph (average speed during Combined City test), and 37.88 mph (average speed during Hwy test). These weight factors would bring data points to the parabola line representing fitted performance of the energy consumption test resulting from the dyno test of this generic vehicle.

The second order polynomial (parabola) fitting routine requires minimum three points to deliver unique fitting curve and the EPA Combined City test includes stops of the vehicle not necessarily representing zero energy consumption. Therefore, in some embodiments, the systems and methods described herein may be configured to generate a third correction factor in the form of the zero offset can be applied to artificially inserted zero velocity point to relocate this point to the desired parabola line. For example, calculation of this offset is provided by the reading of the energy consumption representing EPA Combined City test and multiplying it by an attenuation factor to create an offset landing the zero point on the parabolic fit. The intersection of dyno experiment-generated parabolic fit with the vertical axis is used to calculate the third gain from FTP-75 city energy efficiency reading. This third gain, or rather this time damping coefficient, may be calculated as a ratio of intersection of parabola with vertical axis at zero velocity and FTP-75 energy efficiency reading taken at average vehicle velocity equal to 21.2 miles/hr.

In some embodiments, the parabola always has its maximum at certain specific velocity (for most vehicles between 40 and 50 mph) as for both low and high speed energy consumption increases. Thus the systems and methods described herein may be configured to incorporate this feature to create a point verifying calculation, which may be automated.

In some embodiments, the systems and methods described herein may be configured to determine the energy efficiency/energy consumption characteristic from the EPA data base only once, after receiving relevant information, e.g., via cloud. For example, such information may be received after the VIN number is entered at the initiation of the mobile device. Since, different vehicle types will have different reported results of EPA combined city and highway tests, a different set of three second order polynomial coefficients will be entered into the calibration data base, which subsequently will support the systems and methods at generating a cruising recommendation.

In some embodiments, the systems and methods described herein may be configured to generate an estimation of the velocity and/or load-defined saturation point of energy conversion efficiency of a specific power train. For example, the parabolic fit of energy efficiency may be utilized when making an assessment of energy consumption of cruising speed at moderate speeds on relatively flat roads.

In some embodiments, the systems and methods described herein may be configured to generate an extension of parabolic arm representing high speed that delivers physically impossible negative readings of miles per gallon (e.g., at speeds above approx. 90 mph). Therefore, the systems and methods descried herein may be configured to modify the second order polynomial for high end of the vehicle speeds to be represented in the combusted fuel energy conversion into propulsion of the vehicle.

Ignoring friction losses, which are sometimes moderate when compared to energy consumed to maintain propulsion at high speeds, the engine remains highly efficient at high vehicle speed. As the powertrain friction loss scales with engine RPM, the engine speed is proportional to engine velocity at the highest gear. Thus, in some embodiments, the systems and methods described herein may be configured to determine the conversion efficiency and to re-calculate energy efficiency.

In some embodiments, the systems and methods described herein may be configured to receive the parabolic fit of energy efficiency and determine engine conversion efficiency along its rise all the way to maximum, identified as a saturation point with provision for inclusion of power train friction. Once the saturation point is found, the systems and methods described herein may be configured to determine a real energy efficiency characteristic.

In some embodiments, the systems and methods described herein may be configured to receive or otherwise determine a road grade effect on the energy efficiency characteristic. For example, the systems and methods described herein may be configured to further scale the results as, the EPA results do not include non-zero road grades. To create a compensation to the energy efficiency characteristic, considerations of additional request for energy on rising road slopes, and lower energy consumption on downhills need to be generated.

In some embodiments, the systems and methods described herein may be configured to generate an energy efficiency extra demand/saving calibrator. For example, the calibrator may include calculation of request for fuel for a specific vehicle at one single velocity, namely velocity representing peak energy efficiency. For example, for a generic vehicle this velocity may be equal to 43 mph which may result in energy consumption equal to 61.87 miles/gallon. Typical (gasoline) fuel energy is 42 MJ/kg, thus the systems and methods described herein may be configured to generate the combustion process efficiency to be approx. 24% for the vehicle driven at speed equal to 43 mph on the flat road, at least partially as a function of EPA-provided aerodynamic constants and engine/gear friction. For example, the fuel converts to kinetic energy of the generic vehicle traveling at constant speed of 43 mph and overcoming known friction and aerodynamic forces to deliver constant (cruising) speed of 43 mph. The ratio of required kinetic energy to maintain vehicle speed at 43 mph at flat road to energy of burned fuel may represent the efficiency of the energy conversion (caloric content of the fuel converted with some losses to propel the vehicle). The demand on kinetic energy is further increased (or decreased) when gravity associated with a gradient in the road is considered, representing forces which need to be overcome.

In some embodiments, the systems and methods described herein may be configured to determine the additional demand for power associated with a gradient and include the additional demand into the formula/determination, which extracts energy efficiency characteristic(s) from the energy conversion, which is known at the full range of vehicle velocities in accordance with the disclosure. However, some characteristics which represent steep falling road slopes do not have any representation as gravity alone delivers force necessary to propel the vehicle forward, such that instead of determining fuel saving speeds, the systems and methods described herein may generate a recommendation of coasting.

FIG. 1 generally illustrates a vehicle 10 according to the principles of the present disclosure. The vehicle 10 may include any suitable vehicle, such as a car, a truck, a sport utility vehicle, a mini-van, a cross-over, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles. The vehicle 10 includes a vehicle body 12 and a hood 14. A portion of the vehicle body 12 defines a passenger compartment 18. Another portion of the vehicle body 12 defines the engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position.

The passenger compartment 18 is disposed rearward of the engine compartment 20. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system. In some embodiments, the vehicle 10 may include a petrol or gasoline fuel engine, such as a spark ignition engine. In some embodiments, the vehicle 10 may include a diesel fuel engine, such as a compression ignition engine. In some embodiments, the vehicle 10 may include a battery electric vehicle (BEV) comprising one or more onboard batteries or battery packs configured to provide energy to one or more electric motors of the propulsion system.

The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force which is translated through the transmission to one or more axles which turns wheels 22. When the vehicle 10 includes one or more electric motors, a vehicle battery and/or fuel cell provides energy to the electric motors to turn the wheels 22. In cases where the vehicle 10 includes a vehicle battery to provide energy to the one or more electric motors, when the battery is depleted, it may be connected to an electric grid (e.g., using a wall socket) to recharge the battery cells. Additionally, or alternatively, the vehicle 10 may employ regenerative braking which uses the one or more electric motors of the vehicle 10 as a generator to convert kinetic energy lost due to decelerating back into stored energy in the battery.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

Figure 2:
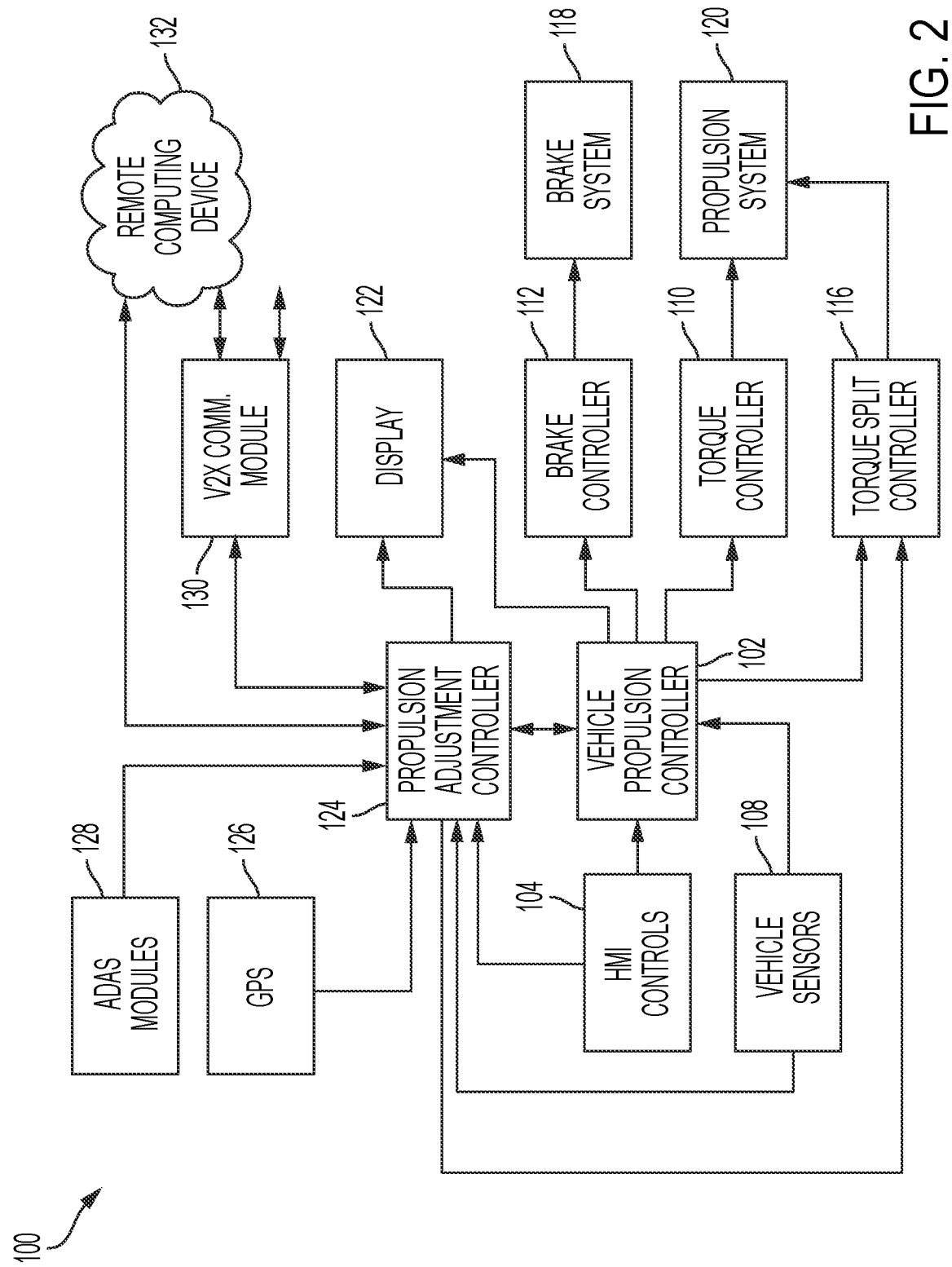
FIG. 2 generally illustrates a block diagram of a vehicle propulsion control system according to the principles of the present disclosure.

FIG. 2 generally illustrates a block diagram of a vehicle propulsion control system 100 according to the principles of the present disclosure. The system 100 may be disposed within a vehicle, such as the vehicle 10. The system 100 is configured to selectively control propulsion of the vehicle 10 and, in some embodiments, the system 100 is configured to determine profiles for a target vehicle speed and/or a target vehicle torque split based on various input information (e.g., route information, vehicle characteristic information, traffic information, other suitable information, or a combination thereof). The profiles of the target vehicle speed and/or the target vehicle torque split correspond to a vehicle speed at which the vehicle 10 achieves an optimum energy consumption efficiency with respect to a portion of a route being traversed by the vehicle 10.

In some embodiments, the system 100 may include a vehicle propulsion controller (VPC) 102, human machine interface (HMI) controls 104, vehicle sensors 108, a torque controller 110, a brake controller 112, a torque split controller 116, a brake system 118, a propulsion system 120, and a display 122. In some embodiment, the display 122 may include a portion of a dash or console of the vehicle 10, a navigation display of the vehicle 10, or other suitable displays of the vehicle 10. In some embodiments, the display 122 may be disposed on a computing device, such as a mobile computing device used by the driver. The mobile computing device may include a smart phone, tablet, laptop computer, or other suitable mobile computing device. In some embodiments, the system 100 may include a propulsion adjustment controller (PAC) 124, a global position system (GPS) antenna 126 in communication with a mapping characteristics module (not shown), advanced driver assistance system (ADAS) modules 128, and a vehicle to other systems (V2X) communication module 130. The V2X communication module 130 may be configured to communication with other vehicles, other infrastructure (e.g., such as traffic infrastructure, mobile computing devices, and/or other suitable infrastructure), a remote computing device (e.g., the remote computing device 132), other suitable systems, or a combination thereof. As will be described, the system 100 may be in communication with one or more remote computing devices 132. In some embodiments, at least some of the components of the system 100 may be disposed in a propulsion control module (PCM) or other onboard vehicle computing devices. For example, at least the PAC 124 and the VPC 102 may be disposed within the PCM. In some embodiments, the system 100 may be at least partially disposed within the PCM while other components of the system 100 are disposed on a standalone computing device having a memory that stores instructions that when executed by a processor cause the processor to carry out the operations of the components. For example, the PAC 124 may be disposed on a memory and executed by a processor. It should be understood that the system 100 may include any combination of computing devices, either disposed locally in the vehicle 10 and/or disposed remotely, as will be described.

In some embodiments, the VPC 102 may include an automatic vehicle propulsion system. For example, the VPC 102 may include a cruise control mechanism, an adaptive cruise control mechanism, an automatic braking system, other suitable automatic vehicle propulsion system, or a combination thereof. Additionally, or alternatively, the VPC 102 may include or be a portion of an autonomous vehicle system that controls all or a portion of vehicle propulsion, steering, braking, safety, route management, other autonomous features, or a combination thereof. It should be understood that, while only limited components of the system 100 are illustrated, the system 100 may include additional autonomous components or other suitable components.

The VPC 102 is in communication with one or more human to machine interfaces (HMI) 104. The HMI controls 104 may include any suitable HMI. For example, the HMI controls 104 may include a plurality of switches disposed on a steering wheel of the vehicle 10, on the dash or console of the vehicle 10, or any other suitable location on the vehicle 10. In some embodiments, the HMI controls 104 may be disposed on a mobile computing device, such as a smart phone, tablet, laptop computer, or other suitable mobile computing device. In some embodiments, the driver of the vehicle 10 may interface with the HMI controls 104 to use the VPC 102 to control vehicle propulsion and/or other features of the VPC 102. For example, the driver may actuate an HMI switch of the HMI controls 104 disposed on the steering wheel of the vehicle 10. The HMI controls 104 may communicate a signal to the VPC 102. The signal may indicate a desired vehicle speed selected by the driver. The VPC 102 generates a torque demand corresponding to the desired vehicle speed and communicates the torque demand to a torque controller 110. The torque controller 110 is in communication with the propulsion system 120 and/or other vehicle propulsion systems of the vehicle 10. The torque controller 110 selectively controls the propulsion system 120 and/or the other vehicle propulsion systems using the torque demand to achieve the desired vehicle speed. The driver may increase or decrease the desired vehicle speed by actuating additional switches of the HMI controls 104. The VPC 102 may adjust the torque demand to achieve the increase or decrease in the desired vehicle speed.

The VPC 102 may continuously adjust the torque demand in order to maintain the desired vehicle speed. For example, the VPC 102 may be in communication with the vehicle sensors 108. The vehicle sensors 108 may include cameras, speed sensors, proximity sensors, gradient sensors, other suitable sensors as will be described, or a combination thereof. The VPC 102 may receive a signal from the vehicle sensors 108 that indicates a current vehicle speed. The VPC 102 may adjust the torque demand to adjust the vehicle speed when the signal indicates that the current vehicle speed is different from the desired vehicle speed. For example, the vehicle 10 may traverse a gradient such as an incline that causes the vehicle 10 to reduce current vehicle speed (e.g., because the torque demand applied by the torque controller 110 is insufficient to maintain vehicle speed while on the incline). The VPC 102 may increase the torque demand in order adjust the current vehicle speed, thereby achieving the desired vehicle speed.

In some embodiments, such as when the VPC 102 includes an adaptive cruise control mechanism, the VPC 102 may adjust the torque demand based on energy consumption targets. For example, the VPC 102 may receive information from the vehicle sensors 108 indicating the presence of a gradient along a segment of the route. The information may be captured by the vehicle sensors 108 using cameras, proximity sensors, radar, the V2X communication module 130, other suitable sensors or input devices, or a combination thereof. The VPC 102 may determine whether to maintain the desired vehicle speed or increase or decrease the torque demand in order to increase or decrease the current vehicle speed to meet energy consumption targets. For example, the driver may indicate, using the HMI controls 104, to maintain a pace that meets an energy consumption target. The VPC 102 may selectively increase or decrease the torque demand to meet energy consumption targets. The VPC 102 may bring the vehicle 10 to a slower speed to meet energy consumption targets. For example, the VPC 102 may be in communication with the torque controller 110 or torque split controller 116 to send a plurality of signals over a period indicating to the torque controller 110 or torque split controller 116 to control vehicle speed.

The brake controller 112 may be in communication with the brake system 118. The brake system 118 may include a plurality of brake components that are actuated in response to the brake controller 112 implementing braking procedures based on the plurality of signals from the VPC 102. In some embodiments, the VPC 102 may implement regenerative braking through a regenerative braking system by adjusting the torque demand to allow the vehicle 10 to come to a stop without use of the brake system 118 or the VPC 102 may use a combination of regenerative braking and the brake system 118 to bring the vehicle 10 to a complete stop. In order to resume vehicle propulsion control, the driver indicates to resume vehicle propulsion control using the HMI controls 104 (e.g., the VPC 102 is not configured to resume vehicle propulsion control without interaction from the driver). In some embodiments, the vehicle 10 may include a higher level of automation including a higher level of propulsion control, as described, and may include suitable controls for bringing the vehicle 10 to a complete stop without interaction with the driver of the vehicle 10.

In some embodiments, the VPC 102 may determine a torque split in order to utilize an internal combustion engine and an electric motor of the vehicle 10 (e.g., in the case where the vehicle 10 is a hybrid vehicle). It should be understood that while only an internal combustion engine and an electric motor are described, the vehicle 10 may include any hybrid combination of any suitable vehicle engines and motors. The torque split indicates a portion of the torque demand to be applied to the internal combustion engine and a portion of the torque demand to be applied to the electric motor. For example, the electric motor may be used for vehicle propulsion when the torque demand is below a threshold. However, when the torque demand is above the threshold (e.g., such as the case when the vehicle 10 is on a gradient such as a steep incline) the internal combustion engine may provide at least a portion of vehicle propulsion in order to assist the electric motor. The VPC 102 communicates the torque split to the torque split controller 116. The torque split controller 116 is in communication with the propulsion system 120 to apply the torque split.

In some embodiments, the VPC 102 includes a plurality of safety controls. For example, the VPC 102 may determine whether to increase or decrease the torque demand, thereby increasing or decreasing the desired vehicle speed or current vehicle speed, based on input from the safety controls. The safety controls may receive input from the vehicle sensors 108. For example, the safety controls may receive proximity sensor information, camera information, other information, or a combination thereof and may generate a safety signal that indicates to the VPC 102 to perform one or more safety operations. For example, in the case of a lead vehicle coming to a sudden stop, the safety controls may generate a safety signal, based on proximity information from the vehicle sensors 108, indicating to the VPC 102 to immediately bring the vehicle 10 to a complete stop. In some embodiments, the VPC 102 may determine whether to apply the desired vehicle speed set by the driver using the HMI controls 104 based on the signal from the safety controls. For example, the driver may increase the desired vehicle speed which may bring the vehicle 10 closer to the lead vehicle (e.g., the vehicle 10 would travel faster than the lead vehicle if the desired vehicle speed were achieved). The VPC 102 may determine not to apply the desired vehicle speed, and instead may provide an indication to the display 122 indicating to the driver that increasing the desired vehicle speed may be unsafe or the VPC 102 may ignore the increase in the desired vehicle speed. In some embodiments, the VPC 102 may be in communication with a transmission controller module (TCM). The VPC 102 may receive information from the TCM (e.g., an automatically selected gear) and may determine and/or adjust the total torque demand based on the information received from the TCM. In some embodiments, the safety control may determine to change a vehicle speed in a manner that decreases energy efficiency to improve safety in view of route or traffic characteristics.

As described, the system 100 includes a PAC 124. The PAC 124 is configured to determine a profile for a target vehicle speed based on, at least, route information of a route being traversed by the vehicle 10, vehicle parameters of the vehicle 10, information about other vehicles proximate to the vehicle 10, traffic information, weather information, the current vehicle speed, the desired vehicle speed, other information, or a combination thereof. As will be described, the PAC 124 may determine the profile for the target vehicle speed based on a profile of the energy consumption efficiency of the vehicle 10. The profile of the energy consumption efficiency may indicate an optimum energy consumption of the vehicle 10 for various route characteristics, such as road grades, curvatures, traffic, speed limits, stop signs, traffic signals, other route characteristics, or a combination thereof. The profile of the energy consumption efficiency may be generated using standardized energy consumption data of at least one other vehicle and scaling it against energy consumption data of the vehicle 10. The standardized energy consumption data of the at least one other vehicle and the energy consumption data of the vehicle 10 may both correspond to energy consumption as a function of speed. The standardized energy consumption data of the at least one other vehicle may be located in the remote computing device 132 and the at least one other vehicle may include a plurality of other vehicles. The standardized energy consumption data of at least one other vehicle may be configured as homologation data. For example, the homologation data may include Environmental Protection Agency (EPA) city/highway energy economy data.

In some embodiments, the profile of energy consumption efficiency may include scaling the standardized energy consumption data by inserting an artificial zero velocity point to have three distinct standardized energy consumption data reference points. In some embodiments, the profile of energy consumption efficiency may include generating a parabolic approximation of energy consumption using the three distinct standardized energy consumption data reference points. In some embodiments, the profile of energy consumption efficiency may include identifying, with the energy consumption of the vehicle, a saturation point of energy conservation, the saturation point corresponding to a speed above threshold wherein the energy efficiency diverges from the parabolic approximation. In some embodiments, the profile of energy consumption efficiency may include identifying at least one or more varying grades along at least one segment of a route and modifying the profile of the energy consumption efficiency by a coefficient of the at least one other vehicle and/or the vehicle 10. In some embodiments, the profile of energy consumption efficiency may include generating a signal corresponding to a recommended route on a mobile computing device. In some embodiments, the profile of energy consumption efficiency may include generating a signal corresponding to a recommended speed along the at least one segment of a route. In some embodiments, the profile of energy consumption efficiency may include adjusting a torque split in view of at least one of momentary energy efficiency or at least one route characteristic. For example, if the route includes a long downward gradient that will result in regenerative braking, the PAC 124 may generate a signal for a torque split wherein the electric motor use is increased to rely on energy that will be regenerated. In some embodiments, the profile of energy consumption efficiency may include adjusting a vehicle speed control input based on the at least one segment of a route with a varying grade and communicating the vehicle speed control input to the VPC 102. In some embodiments, the profile of energy consumption efficiency may include generating a signal corresponding the speed of the vehicle to at least one segment of the route being traversed by the vehicle on a mobile computing device.

The PAC 124 receives route characteristics (e.g., road gradient characteristics, route distance, and route directions), vehicle parameters, traffic characteristics, weather characteristics, vehicle to vehicle parameters, other information or characteristics, or a combination thereof. In some embodiments, the PAC 124 receives at least some of the route characteristics from a mapping characteristics module based on location information from the GPS antenna 126. The mapping characteristics module disposed within the vehicle 10 (e.g., within the system 100) or may be disposed on a remote computing device, such as the remote computing device 132. When the mapping characteristics module is disposed on the remote computing device 132, the GPS antenna 126 may capture various global positioning signals from various global positioning satellites or other mechanisms. The GPS antenna 126 may communicate the captured signals to the mapping characteristics module. The mapping characteristics module may generate the route characteristics based on the signals received from the GPS antenna 126 and communicate the route characteristics to the PAC 124. For example, the PAC 124 may receive a route distance, route directions, road grade information of the route, other route characteristics, or a combination thereof. In some embodiments, the PAC 124 may receive traffic signal location information, traffic stop sign location information, posted speed limit information, lane shift information, other route characteristics or information, or a combination thereof, from the mapping characteristics module based on location information from the GPS antenna 126. In some embodiments, the PAC 124 may receive information about changes in gradients over segments of the route. In some embodiments, the information about changes in gradients over segments of the route may include distinguishing a negative gradient from a positive gradient, identifying a magnitude of the gradient, a length of the gradient, and a rate of change of the gradient.

The PAC 124 may receive further vehicle parameters from the vehicle sensors 108. For example, the vehicle sensors 108 may include an energy level sensor (e.g., a fuel level sensor or a battery charge sensor), an oil sensor, a speed sensor, a weight sensor, other suitable sensors, or a combination thereof. The PAC 124 may receive an energy level (fuel level, battery charge, etc.) of the vehicle 10, a current weight of the vehicle 10, an oil condition of the vehicle 10, tire inflation information of the vehicle 10, a current vehicle speed, engine temperature information, other suitable vehicle parameters of the vehicle 10, or a combination thereof from the vehicle sensors 108. In some embodiments, the vehicle sensors 108 may include weather sensors, such as, a precipitation sensor or moisture sensor, a barometric pressure sensor, an ambient temperature sensor, other suitable sensors, or a combination thereof. The PAC 124 may receive current weather information, such as precipitation information, barometric pressure information, ambient temperature information, other suitable weather information, or a combination thereof, from the vehicle sensors 108.

The PAC 124 may receive at least some of the route characteristics from the ADAS modules 128. The ADAS modules 128 may assist the driver of the vehicle 10 to improve vehicle safety, road safety, and energy conservation. The ADAS modules 128 may be configured to automate and/or adapt and enhance vehicle systems for safety and more efficient driving. The ADAS modules 128 may be configured to generate a signal to alert the driver of the vehicle 10 of upcoming traffic conditions or disabled vehicles and/or to alert the vehicle 10 of a vehicle proximate to the vehicle 10 in order to avoid collisions and accidents. In some embodiments, the ADAS modules 128 may be configured to generate a signal to selectively instruct the adjustment of at least one of a speed of the vehicle, at least one route characteristic of a portion of a route being traversed by the vehicle, and a torque demand of the vehicle. Further, the ADAS modules 128 may autonomously avoid collisions by implementing safeguards and taking over control of the vehicle 10, such as, by automatic lighting, initiating adaptive cruise control (e.g., via the VPC 102) and collision avoidance (e.g., by controlling a trajectory of the vehicle 10 or bringing the vehicle 10 to a complete stop either using the VPC 102 or directly using the brake controller 112). The PAC 124 may receive information, such as traffic characteristics, vehicle proximity information, disabled vehicle information, other suitable information, or a combination thereof, from the ADAS modules 128. The ADAS modules 128 may initiate an adaptive cruise control with a target speed or torque split based on a profile of the energy consumption efficiency of the vehicle.

The PAC 124 may receive, at least, some of the route characteristics from the V2X module communication 130. The V2X communication module 130 is configured to communicate with other systems proximate or remotely located from the vehicle 10, as described, to obtain and share information, such as, traffic information, vehicle speed information, construction information, other information, or a combination thereof. The PAC 124 may receive other vehicle speed information, other vehicle location information, other traffic information, standardized energy consumption data as function of speed, energy consumption data corresponding to the vehicle as a function of speed, construction information, other suitable information, or a combination thereof, from the V2X communication module 130.

The PAC 124 may receive, at least, some of the route characteristics from the remote computing device 132. For example, the PAC 124 may receive further information regarding route distance, route directions, road grade information of the route, traffic information, construction information, other vehicle location information, other vehicle speed information, vehicle maintenance information of the vehicle 10, other route characteristics, or a combination thereof, from the remote computing device 132. Additionally, or alternatively, the PAC 124 may receive vehicle parameters from the remote computing device 132, such as, a make and model of the vehicle 10, manufacturer provided energy consumption efficiency of the vehicle 10, a weight of the vehicle 10, other vehicle parameters, or a combination thereof. In some embodiments, the PAC 124 may receive traffic signal location information, traffic stop sign location information, posted speed limit information, lane shift information, other route characteristics or information, or a combination thereof, from the remote computing device 132. In some embodiments, the PAC 124 may receive standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof, from the remote computing device 132.

The remote computing device 132 may include any suitable computing device or devices, such as a cloud computing device or system, a remotely located server or servers, a remotely or proximately located mobile computing device or application server that provides information to a mobile computing device, other suitable remote computing devices, or a combination thereof. The remote computing device 132 is remotely located from the vehicle 10, such as in a datacenter or other suitable location. In some embodiments, the remote computing device 132 may be located within the vehicle 10 (e.g., a mobile computing device used by the driver of the vehicle 10).

In some embodiments, the PAC 124 may receive traffic signal information, such as traffic signal phase and timing (SPaT) from a smart algorithm used by a traffic data provider. The SPaT information may indicate when traffic signals are changing and/or the timing of traffic signals.

The PAC 124 may receive route characteristics and/or vehicle parameters from the driver of the vehicle 10. For example, the driver may interact with an interface of the PAC 124, such as using the display 122 or using a mobile computing device, to provide vehicle parameters of the vehicle 10, such as, vehicle weight, energy efficiency targets, vehicle make and model, vehicle age, vehicle maintenance information, vehicle identification number, a number of passengers, load information (e.g., an amount of luggage or other load information), other vehicle parameters, or a combination thereof. Additionally, or alternatively, the driver may provide route characteristics, such as a route map, route distance, other route characteristics, or a combination thereof, to the PAC 124. In some embodiments, the PAC 124 learns behavior of the driver of the vehicle 10. For example, the PAC 124 monitors the vehicle speed (e.g., controlled by the driver) relative to posted speed limits or whether the driver implements a vehicle speed recommendation, as will be described, provided by the PAC 124.

In some embodiments, the PAC 124 may learn traffic patterns for known routes traversed by the vehicle 10. For example, the PAC 124 may track traffic conditions while the vehicle 10 traverses one or more routes on a routine or regular basis. The PAC 124 may determine traffic patterns for the routes based on the monitored traffic conditions. In some embodiments, the PAC 124 receives traffic patterns for a route the vehicle 10 is traversing from the remote computing device 132, or from the mapping characteristics module based on the signals from the GPS antenna 126, as described.

It should be understood that the PAC 124 may receive any characteristics or information associated with routes, traffic, signage and signals, other vehicles, vehicle parameters of the vehicle 10, any other suitable characteristics or information, including those described or not described here, from any of the components described or not described herein. Additionally, or alternatively, the PAC 124 may be configured to learn any suitable characteristics or information described or not described herein.

In some embodiments, the PAC 124 is configured to control propulsion of the vehicle 10. The PAC 124 may be an integrated component of the VPC 102, or may be an overlay component that communicates with or interfaces with the VPC 102 and/or other components of the vehicle 10. Additionally, or alternatively, the PAC 124 may be disposed on a mobile computing device, such as a smart phone that uses, at least, some of the information described above, to present the driver of the vehicle 10 with a recommended vehicle speed. In some embodiments, the VPC 102 may include an adaptive cruise control mechanism. As described, the adaptive cruise control mechanism is configured to maintain the desired vehicle speed provided by the driver of the vehicle 10 using the HMI controls 104, and the adaptive cruise control mechanism may be configured to meet energy consumption targets based on the profile of the energy consumption efficiency. The PAC 124 is configured to determine the profile of the energy consumption efficiency, which may include generating a signal to selectively adjust one or more target vehicle speeds, one or more target torque splits, and one or more route adjustments based on a profile of the energy consumption efficiency for the vehicle 10. The PAC 124 may determine a target torque demand based on profiles of the target vehicle speed, the target torque split, and the route characteristics as a function of energy consumption efficiency.

In some embodiments, the PAC 124 determines the vehicle profile of the energy consumption efficiency using the information described above. For example, the PAC 124 may determine the vehicle consumption profile using a vehicle weight, manufacturer provided vehicle energy efficiency, historical data corresponding to the vehicle 10 or similar vehicles indicating energy consumption of the vehicle 10 or similar vehicles while traversing portions of a particular route or specific road grades, or other suitable route or road information, other suitable vehicle parameters, or a combination thereof. The vehicle profile of the energy consumption efficiency may indicate that the vehicle 10 consumes a specified amount of energy (e.g., within a tolerance range) while operating at a specific vehicle speed (within a tolerance) while traversing routes having particular road, traffic, gradient, and other conditions. For example, the energy consumption of the vehicle 10 may be greater when the vehicle 10 is on an incline and may be less when the vehicle 10 is coasting to a stop. In some embodiments, the PAC 124 receives or retrieves a vehicle energy profile for the vehicle 10 determined remotely from the vehicle 10, such as by the remote computing device 132. In some embodiments, the PAC 124 receives or retrieves standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof.

The PAC 124 is configured to use the vehicle profile of the energy consumption efficiency and various route characteristics to determine the profiles for the target vehicle speed, target torque split, and the route characteristics as a function of energy consumption efficiency for a portion of a route being traversed by the vehicle 10. For example, the PAC 124 may determine that the vehicle 10 is approaching a particular variation in grade over the portion of the route being traversed by the vehicle 10. The PAC 124 uses the vehicle profile of the energy consumption efficiency to identify a vehicle speed (within a threshold range of the desired vehicle speed provided by the driver to the VPC 102) and/or a torque split having an optimum energy consumption for the grade variation of the portion of the route being traversed by the vehicle. In some embodiments, the PAC 124 may determine the vehicle speed and torque split using historical energy consumption for a known route, such as a route previously traversed by the vehicle 10 or similar vehicles.

The PAC 124 determines a target torque demand from the identified vehicle speed and determines a target torque split from the identified torque split. It should be understood that the PAC 124 continuously monitors the various characteristics received, as described, and continues to generate profiles for target vehicle speeds, target torque splits, and the route characteristics as a function of energy consumption efficiency, such that, the vehicle 10 maintains an optimum or improved energy consumption while maintaining driver and/or passenger comfort (e.g., by avoiding sudden, unnecessary changes in vehicle speed). In some embodiments, the PAC 124 may generate a signal to bypass or detour certain segments of the route to save energy efficiency. The recommended detour may then be confirmed by the vehicle operator via the HMI controls 104. For example, the PAC 124 may generate a signal that recommends a detour that would add time but save fuel and the operator may select whether to follow the recommendation based on personal priorities.

In some embodiments, the PAC 124 may be configured to determine when the vehicle 10 should coast to achieve optimum or improved energy consumption of the vehicle 10. For example, the PAC 124 may use known traffic conditions, as described, to determine when the vehicle 10 should coast. Additionally, or alternatively, the PAC 124 may learn traffic conditions, as described, and may determine whether the vehicle 10 should coast in areas along a route known to typically have traffic based, for example, on time of day. In some embodiments, the PAC 124 may use SPaT information to determine when the vehicle 10 should coast in response to change traffic signals. Additionally, or alternatively, the PAC 124 may determine to increase the target vehicle speed associated with the profile for the target vehicle speed (e.g., within the posted speed limit) in order to increase a likelihood that the vehicle 10 will arrive at a traffic signal while the traffic signal indicates to proceed, which may allow the vehicle 10 to avoid having to stop at traffic signals, based on traffic single timing. In some embodiments, the PAC 124 may determine that a long downward gradient will result in a certain amount of regenerative braking and generate a signal to expend energy from the electric motor before the vehicle reaches the downward gradient.

In some embodiments, the PAC 124 may be configured to calculate a coast function and/or a road load function (see the Equation (1)) to identify particular vehicle parameters using velocity dependent resistance force. Parameters of the road load function include, vehicle parameters, such as vehicle mass or weight, vehicle rolling friction, vehicle drag coefficient, other vehicle parameters, or a combination thereof, which may be received by the PAC 124, as described. These parameters can then be updated using a coast self-learning function, such that the PAC 124 identifies or requests a coast sequence, (e.g., from historical information and/or from the remote computing device 132) and calculates the coast function result. The PAC 124 may calculate the coast function when requested by the driver of the vehicle 10 who would be prompted to perform a particular learning maneuver by the PAC 124, or could be learned in the background.

Velocity dependent resistive forces: $F$=wind, tires, bearings, and other forces plus acceleration dependent inertial forces plus grade dependent gravitational forces: $F=(A+(B*v)+(C*v^2))+((1+\text{drive axle \%+non-drive axle \%})*(\text{Test Mass}*\text{acceleration}))+(\text{Test Mass}*g*\sin(\arctan(\text{grade \%})))$ Equation (1)

Where A represents the resistive force that is constant and does not vary with velocity (e.g., bearings, seals, tires, etc.,), B represents the resistive force that varies linearly with velocity (e.g., drive train, differential, etc.), and C represents the resistive force that varies with the square of velocity (e.g., aerodynamic drag, tire deformation, etc.)

As described, the PAC 124 may control or interface with the VPC 102 and/or interface with the driver of the vehicle 10 in order to achieve the target vehicle speed, the target torque split, and the route characteristics as a function of energy consumption efficiency, which may result in optimum or improved energy consumption efficiency of the vehicle 10. Additionally, or alternatively, the PAC 124 may control or interface with the VPC 102 in order to bring the vehicle 10 to a complete stop in response to the vehicle 10 approaching a stop sign, traffic signal, traffic, disabled vehicle, or other suitable conditions. The PAC 124 may also control or interface with the VPC 102 in order to resume vehicle propulsion after the vehicle 10 has come to a complete stop.

In some embodiments, the PAC 124 may control or interface with the VPC 102 using virtual inputs in order to achieve the target vehicle speed, the target torque split, and the route characteristics as a function of energy consumption efficiency. As described, the VPC 102 may receive a desired vehicle speed from the driver of the vehicle 10 using the HMI controls 104. Virtual inputs as described herein may include inputs generated by the PAC 124 or other suitable component disposed within the vehicle 10 or remotely located from the vehicle 10 that cause allow the PAC 124 or other suitable component to control aspects of the vehicle 10 according to one or more control targets or other targets, such as those described herein. Additionally, or alternatively, the VPC 102 (e.g., when the VPC 102 includes an adaptive cruise control mechanism) may adjust the desired vehicle speed in response to the profile of the energy consumption efficiency.

In some embodiments, the PAC 124 initializes the VPC 102 using the desired speed provided by the driver of the vehicle 10 the first time the driver of the vehicle 10 engages the VPC 102 during a key cycle. The PAC 124 may then provide a signal in the form of the virtual inputs to the VPC 102 in order to control vehicle speed to achieve optimum or improved energy consumption efficiency of the vehicle 10. In some embodiments, the PAC 124 may generate a signal in the form of a virtual input that includes a virtual HMI signal that, when received by the VPC 102, may cause the VPC 102 to be enabled, be disabled, and/or to set or adjust the current vehicle speed. The PAC 124 generates the virtual HMI signal based on target vehicle speed profile. The PAC 124 is in communication with and/or interfaces with the HMI controls 104. The PAC 124 substitutes HMI signals provided by the driver of the vehicle 10 with the virtual HMI signal generated by the PAC 124. The VPC 102, as described, includes a plurality of safety controls. The VPC 102 then applies the target vehicle speed associated with the target vehicle speed profile indicated by the virtual HMI signal, in the same manner the VPC 102 applies a desired vehicle speed provided by the driver using the HMI controls 104, as described. The VPC 102 may determine whether to apply the target vehicle speed and/or the target torque split indicated by the virtual HMI signals based on the safety controls.

In some embodiments, the PAC 124 generates a virtual input based on the profile of the energy consumption efficiency in order to control the VPC 102 to meet certain energy consumption targets. The energy consumption targets may be momentary increases based on current route conditions or an overall consumption target corresponding to an entire route from a starting location to a travel destination. For example, a vehicle 10 may need to go to a charging or fuel station with a limited amount of fuel (e.g., electricity, gasoline, etc.), the PAC 124 may determine a station corresponding to the smallest overall consumption profile based on at least one route characteristic of a portion of a route being traversed by the vehicle. The at least one route characteristic of a portion of a route being traversed by the vehicle may include route length, speed limit, segments of the route with gradients, traffic, the number of stops, and other factors that impact energy consumption. The PAC 124 may then generate a signal on the most energy efficient route, torque split, and target speed. The signal may be in the form of a recommendation to a driver, instructions to the adaptive cruise control, instructions for autonomous driving, or a filtering of driver input (for example, by the ADAS Module 128).

The VPC 102 may generate and detect the presence of a virtual lead car and perform operations associated with following a lead car (e.g., maintain a safe distance between the vehicle 10 and the lead car, keeping pace with the lead car, and bringing the vehicle to a stop in response to the lead car being within an object range of the vehicle 10 and coming to a complete stop). The PAC 124 may then control a virtual speed of the virtual lead car based on the target vehicle speed profile. The VPC 102 may then adjust the current vehicle speed of the vehicle 10 to follow the virtual lead car. In this manner, the PAC 124 may achieve the target vehicle speed profile of the vehicle 10 to provide optimum or improved energy consumption efficiency of the vehicle 10. While the PAC 124 is controlling the VPC 102 using the virtual inputs described, the vehicle sensors 108, such as cameras, radar, proximity sensors, and the like, continue to provide information to the VPC 102, such that, while the VPC 102 is applying or following the virtual inputs provided by the PAC 124, the VPC 102 may continue to detect actual vehicles or objects in front of the vehicle 10. The safety controls of the VPC 102 are configured to override the VPC 102, including the virtual inputs provided by the PAC 124, to safely bring the vehicle 10 to a complete stop or increase or decrease vehicle speed in response to the information from the vehicle sensors 108.

In some embodiments, the PAC 124 may be in direct communication with the VPC 102 and the torque split controller 116 to provide recommended target torque demands and target torque splits to the VPC 102 and the torque split controller 116, respectively, to achieve an optimum or improved energy consumption efficiency of the vehicle 10. For example, the VPC 102 may be configured to receive HMI signals (e.g., as described), to meet a certain energy consumption target based on profile of the energy consumption efficiency, and to receive a recommended target vehicle speed signal from the PAC 124. The VPC 102 may determine whether to apply the target vehicle speed indicated by the recommended target vehicle speed signal, for example, based on the driver input, the profile of the energy consumption efficiency, and/or the safety controls of the VPC 102.

The torque split controller 116 may be configured to receive a recommended torque split signal from the VPC 102 based on the driver input, as described, and may be configured to receive a recommended target torque split signal from the PAC 124. It should be understood that the PAC 124 may communicate the recommended target torque split signal to the VPC 102, which then may communicate the recommended target torque split signal and/or the recommended torque demand signal (e.g., generated by the VPC 102) to the torque split controller 116. The torque split controller 116 determines whether to apply the target torque split indicated by the recommended target toque split signal based on a comparison to the torque split indicated by the recommended torque split signal provided by the VPC 102 and/or based on an existing propulsion state of the vehicle 10 (e.g., including diagnostic conditions).

In some embodiments, the PAC 124 may communicate with the display 122 to provide an indicator to the driver that the vehicle speed is changing in order to improve energy consumption efficiency of the vehicle 10. For example, the PAC 124 may use the display 122 to illustrate an energy efficiency symbol that indicates to the driver of the vehicle 10 that the vehicle speed is changing in order to improve energy consumption efficiency of the vehicle 10.

In some embodiments, as described, the VPC 102 may not include an adaptive cruise control system and may include a basic cruise control system. Additionally, or alternatively, the driver of the vehicle 10 may not engage the VPC 102 in order to control propulsion of the vehicle 10 (e.g., the driver of the vehicle 10 may control propulsion manually). Accordingly, the PAC 124 is configured to provide a recommendation to the driver indicating a target vehicle speed of a target vehicle speed profile. The recommendation may be provided to the driver of the vehicle 10 using one or more integrated displays of the vehicle 10, such as the display 122 which may include a portion of a dash or console of the vehicle 10, a navigation display of the vehicle 10, or other suitable integrated displays of the vehicle 10. In some embodiments, the recommendation may be provided to the driver of the vehicle 10 using a mobile computing device within the vehicle 10. The recommendation may include a symbol or textual information that indicates to the driver of the vehicle 10 to increase or decrease vehicle speed. Additionally, or alternatively, the recommendation can include a coast recommendation that is displayed for a calabratable amount of time and is then withdrawn in response to the driver of the vehicle 10 ignoring the recommendation. The recommendation can include information indicating that the recommendation is in response to a change in speed limit, a stop sign being approached by the vehicle 10, traffic signal timing, and status, energy consumption targets, or other information. The information may be visually displayed and may decay as the vehicle 10 recommendation becomes obsolete.

The driver of the vehicle 10 may determine to honor the recommendation and change the vehicle speed accordingly, or the driver may choose to ignore the recommendation. The PAC 124 may be configured to monitor drive action in response to the recommendation to determine whether the driver of the vehicle 10 honored the recommendation or ignored the recommendation. The PAC 124 may determine whether to adjust recommendations based on the monitored driver action. For example, the PAC 124 may determine not to recommend coasting in response to the driver ignoring a threshold number of coasting recommendations. Additionally, or alternatively, the PAC 124 may determine, using the monitored driver action and the route traversed by the vehicle 10, whether the driver of the vehicle 10 honors the recommendation at certain portions of the route and ignores the recommendations at other portions of the route. The PAC 124 may selectively provide the recommendations to the driver of the vehicle 10 based on the monitored driver action and the vehicle route. Additionally, or alternatively, the PAC 124 may monitor the driver action in response to the recommendation based on traffic patterns, stop signs, traffic signals, energy consumption targets and the like. The PAC 124 may selectively determine whether to provide the driver of the vehicle 10 the recommendations based on the monitored driver action in response to traffic patterns, stop signs, traffic signals, energy consumption targets, and the like.

In some embodiments, the PAC 124 and/or the VPC 102 may perform the methods described herein. However, the methods described herein as performed by the PAC 124 and/or the VPC 102 are not meant to be limiting, and any type of software executed on a controller can perform the methods described herein without departing from the scope of this disclosure. For example, a controller, such as a processor executing software within a computing device onboard the vehicle 10, can perform the methods described herein.

Figure 3:
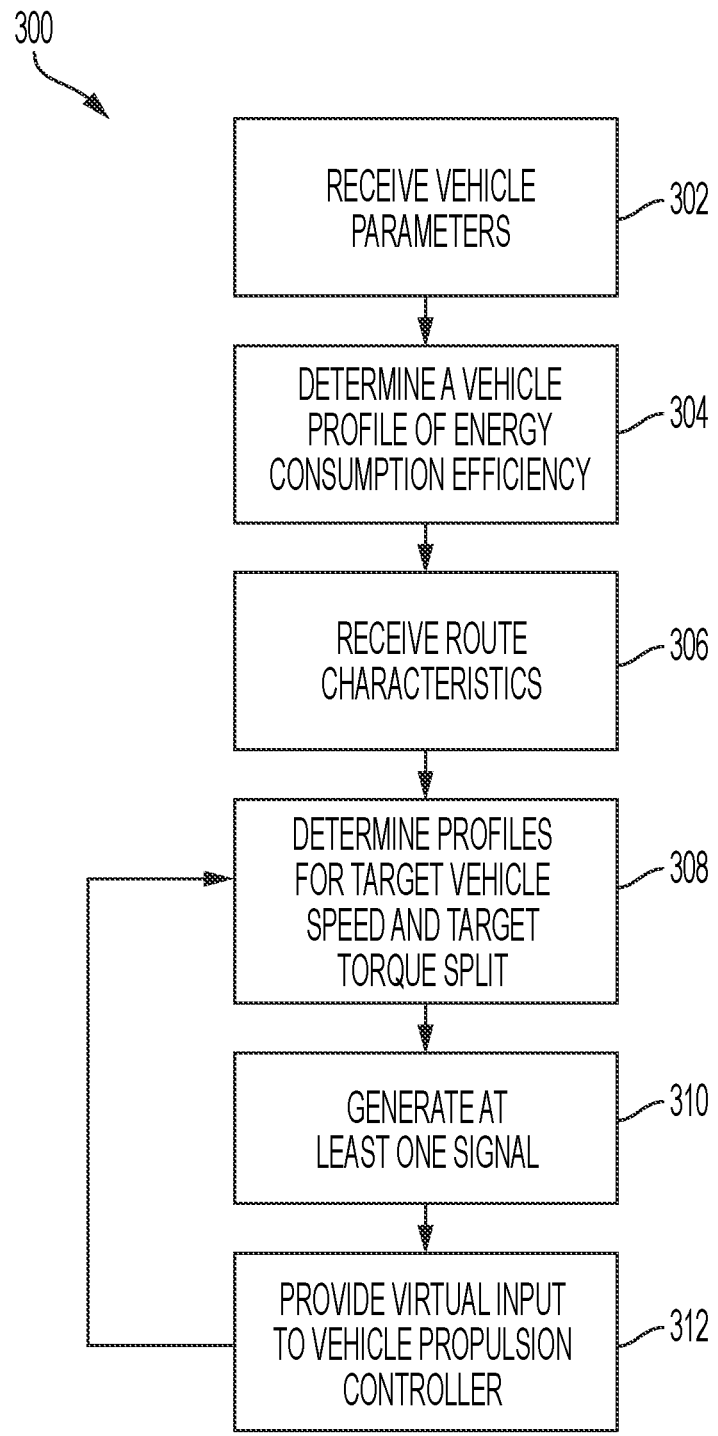
FIG. 3 is a flow diagram generally illustrating an energy consumption estimation method according to the principles of the present disclosure.

FIG. 3 is a flow diagram generally illustrating an energy consumption estimation method 300 according to the principles of the present disclosure. At 302, the method 300 receives vehicle parameters. As described, the PAC 124 may receive various vehicle parameters of the vehicle 10 from any of the components described herein. At 304, the method 300 determines a vehicle profile of the energy consumption efficiency. As described, the PAC 124 determines the profile of the energy consumption efficiency for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. In some embodiments, the V2X communication module 130 may receive standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof, to generate the profile of the energy consumption efficiency. At 306, the method 300 receives route characteristics. As described, the PAC 124 receives various route characteristics (e.g., route characteristics for a route the vehicle 10 is either currently traversing or will traverse) and other information from any other components described herein. For example, the PAC 124 may receive information about varying gradients along segments of the route. In some embodiments, the method continues at 308. In some embodiments, the method continues at 310. At 308, the method 300 determines profiles for the target vehicle speed, the target torque split, and the route characteristics as a function of energy consumption efficiency. As described, the PAC 124 determines profiles for a target vehicle speed and/or a target torque split based on the vehicle parameters, the route characteristics, the profile of the energy consumption efficiency of the vehicle 10, other information received, as described, from the various components described herein. The profiles of the target vehicle speed and/or target vehicle torque split correspond to a vehicle speed and/or a torque split that, when achieved by the vehicle 10, provide an optimum, or improved energy consumption efficiency of the vehicle 10.

At 310, the method 300 generates at least one signal. As described, the PAC 124 generates the at least one signal. The signal may include a HMI signal and/or a recommendation for improved energy consumption efficiency of the vehicle 10. The signal, when applied by the VPC 102, achieves the target vehicle speed, the target torque split, and route characteristics. For example, the PAC 124 may generate a recommendation to detour certain segments of a route. In some embodiments, the recommendation is provided to the operator. In some embodiments, the recommendation is an instruction received by VPC 102 to perform autonomously. At 312, the method 300 provides the signal to the vehicle propulsion controller. As described, the PAC 124 may substitute HMI signals communicated from the HMI controls 104 based on input from the driver of the vehicle 10 with the virtual HMI signals. Additionally, or alternatively, the PAC 124 may substitute vehicle sensor information provided by the vehicle sensors 108 to indicate the virtual lead vehicle to the VPC 102. As described, the VPC 102 may apply the virtual HMI signals and/or may follow the virtual lead vehicle in order to achieve the target vehicle speed and/or torque split. As described, the PAC 124 may continuously update the target vehicle speed and/or target torque split as the vehicle 10 continues to traverse the route and based on updated traffic information, vehicle information, route information, other information, or a combination thereof.

Figure 4:
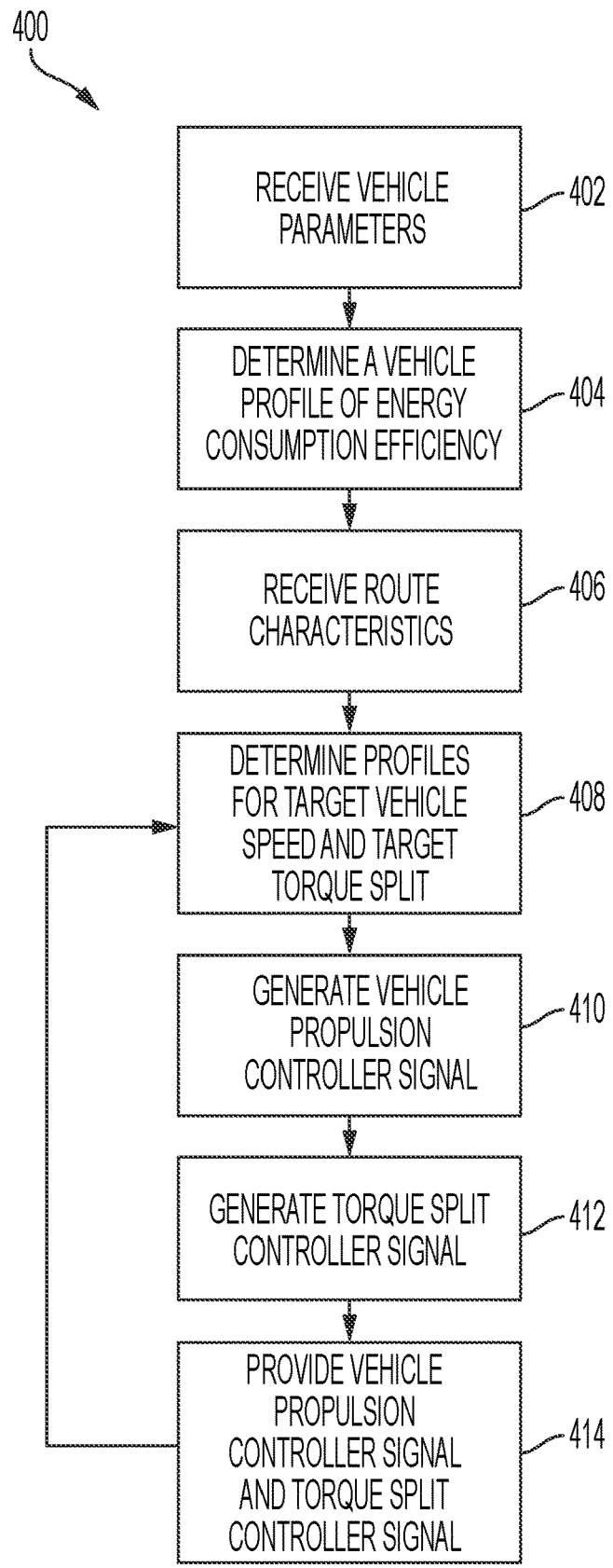
FIG. 4 is a flow diagram generally illustrating an alternative energy consumption estimation method according to the principles of the present disclosure.

FIG. 4 is a flow diagram generally illustrating an alternative energy consumption estimation method 400 according to the principles of the present disclosure. At 402, the method 400 receives vehicle parameters. As described, the PAC 124 may receive various vehicle parameters of the vehicle 10 from any of the components described herein. At 404, the method 400 determines a vehicle profile of the energy consumption efficiency. As described, the PAC 124 determines the profile of the energy consumption efficiency for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. In some embodiments, the PAC 124 determines the profile of the energy consumption efficiency for the vehicle 10 using the standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof.

At 406, the method 400 receives route characteristics. As described, the PAC 124 receives various route characteristics (e.g., route characteristics for a route the vehicle 10 is either currently traversing or will traverse) and other information from any other components described herein. For example, the PAC 124 may receive information about segments of the route with varying gradients. In some embodiments, the method continues at 408. In some embodiments, the method continues at 410. At 408, the method 400 determines profiles for the target vehicle speed, the target torque split, and the route characteristics as a function of energy consumption efficiency. As described, the PAC 124 determines profiles for the target vehicle speed, the target torque split, and the route characteristics based on the vehicle parameters, the route characteristics, the profile of the energy consumption efficiency of the vehicle 10, other information received, as described, from the various components described herein. The profiles for the target vehicle speed and/or target vehicle torque split correspond to a vehicle speed and/or a torque split that, when achieved by the vehicle 10, provide an optimum, or improved energy consumption efficiency of the vehicle 10.

At 410, the method 400 generates a vehicle propulsion controller signal. As described, the PAC 124 is in direct communication with the VPC 102 and may provide signals as an input to the VPC 102. The PAC 124 generates the vehicle propulsion controller signal based on the target vehicle speed. The vehicle propulsion controller signal may be referred to as a recommended target vehicle speed. At 412, the method 400 generates a torque split controller signal. As described, the PAC 124 may be in direct communication with the torque split controller 116 and may provide signals as inputs to the torque split controller 116. The PAC 124 generates the torque split controller signal based on the target torque split. The torque split controller signal may be referred to as a recommended target torque split. At 414, the method 400 provides the vehicle propulsion controller signal and the torque split controller signal. As described, the PAC 124 may provide the vehicle propulsion controller signal to the VPC 102. The VPC 102 may determine whether to apply the target vehicle speed indicated by the vehicle propulsion controller signal, as described. The PAC 124 may provide the torque split controller signal to the torque split controller 116 or may provide the torque split controller signal to the VPC 102, which then may provide the torque split signal to the torque split controller 116. The torque split controller 116 may then determine whether to apply the torque split indicated by the torque split controller signal, as described. The vehicle propulsion controller signal and torque split controller signal correspond to a vehicle speed and/or a torque split that, when achieved by the vehicle 10, provide an optimum, or improved energy consumption efficiency of the vehicle 10. As described, the PAC 124 may continuously update the target vehicle speed, the target torque split, and the route characteristics as the vehicle 10 continues to traverse the route and based on updated traffic information, vehicle information, route information, other information, or a combination thereof.

Figure 5:
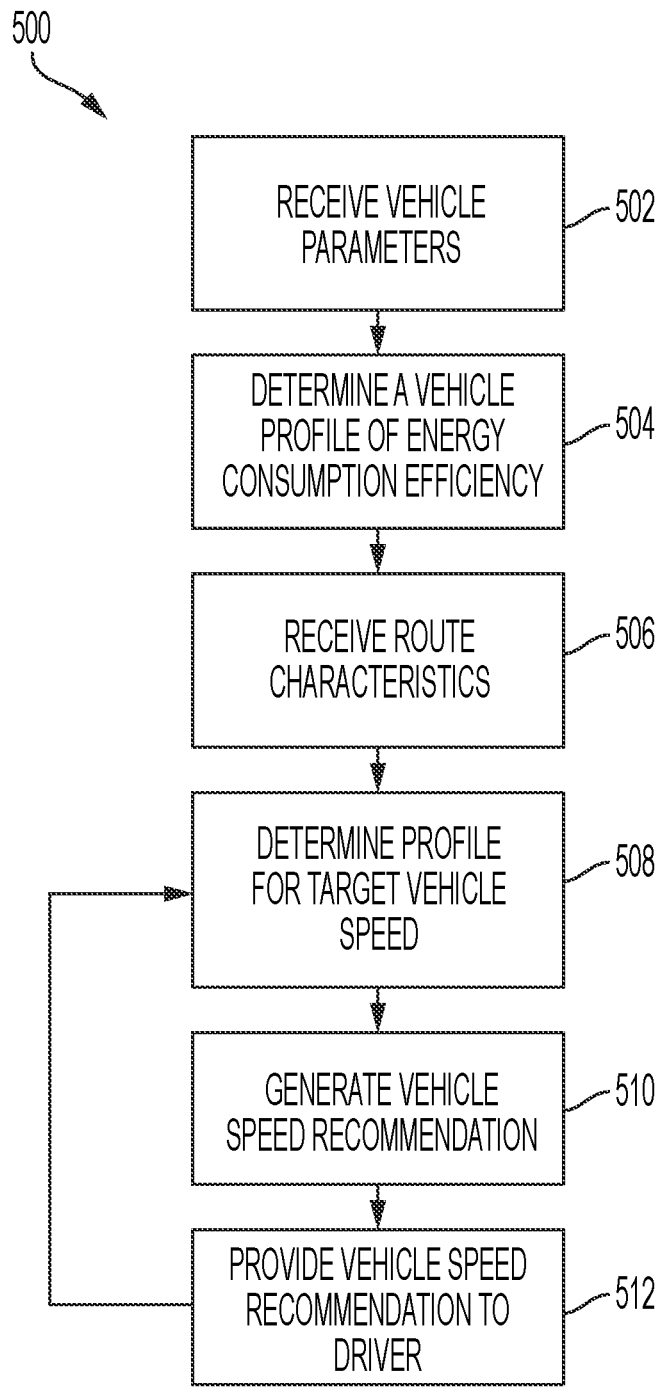
FIG. 5 is a flow diagram generally illustrating an alternative energy consumption estimation method according to the principles of the present disclosure.

FIG. 5 is a flow diagram generally illustrating an alternative energy consumption estimation method 500 according to the principles of the present disclosure. At 502, the method 500 receives vehicle parameters. As described, the PAC 124 may receive various vehicle parameters of the vehicle 10 from any of the components described herein. At 504, the method 500 determines a vehicle profile of the energy consumption efficiency. As described, the PAC 124 determines the profile of the energy consumption efficiency for the vehicle 10 using the vehicle parameters and/or other route characteristics, such as historical route characteristics associated with routes previously traversed by the vehicle, route characteristics associated with routes previously traversed by similar vehicles (e.g., from the remote computing device 132 and/or the V2X communication module 130, other suitable route characteristics, or a combination thereof. In some embodiments, the PAC 124 determines the profile of the energy consumption efficiency for the vehicle 10 using standardized energy consumption data of at least one other vehicle, homologation data, a plurality of standardized energy consumption data reference points, a parabolic approximation of energy consumption, a saturation point of energy conservation corresponding to a speed above threshold wherein the energy efficiency diverges from the parabolic approximation, and a coefficient corresponding to modified energy consumption based on at least one characteristic of a gradient on a segment of the route, or combinations thereof.

At 506, the method 500 receives route characteristics. As described, the PAC 124 receives various route characteristics (e.g., route characteristics for a route the vehicle 10 is either currently traversing or will traverse) and other information from any other components described herein. In some embodiments, the route characteristics include segments having varying gradients. In some embodiments, the method continues at 508. In some embodiments, the method continues at 510. At 508, the method 500 determines profiles for a target vehicle speed. As described, the PAC 124 determines a profile for a target vehicle speed based on the vehicle parameters, the route characteristics, the profile of the energy consumption efficiency of the vehicle 10, other information received, as described, from the various components described herein. The profile for the target vehicle speed corresponds to a vehicle speed that, when achieved by the vehicle 10, provide an optimum or improved energy consumption efficiency of the vehicle 10.

At 510, the method 500 generates a vehicle speed recommendation. For example, the PAC 124 generates a vehicle speed recommendation based on the profile of the target vehicle speed. At 512, the method 500 provides the vehicle speed recommendation to the driver. As described, the PAC 124 may provide the vehicle speed recommendation to the driver of the vehicle 10 using the display 122, a mobile computing device, or other suitable devices or displays capable of providing the vehicle speed recommendation to the driver of the vehicle 10. As described, the driver of the vehicle 10 may honor the vehicle speed recommendation or ignore the vehicle speed recommendation. The vehicle speed recommendation corresponds to a vehicle speed, when achieved by the vehicle 10, provide an optimum, or improved energy consumption efficiency of the vehicle 10. As described, the PAC 124 may continuously update the profile of the target vehicle speed split as the vehicle 10 continues to traverse the route and based on updated traffic information, vehicle information, route information, other information, or a combination thereof.

Figure 6:
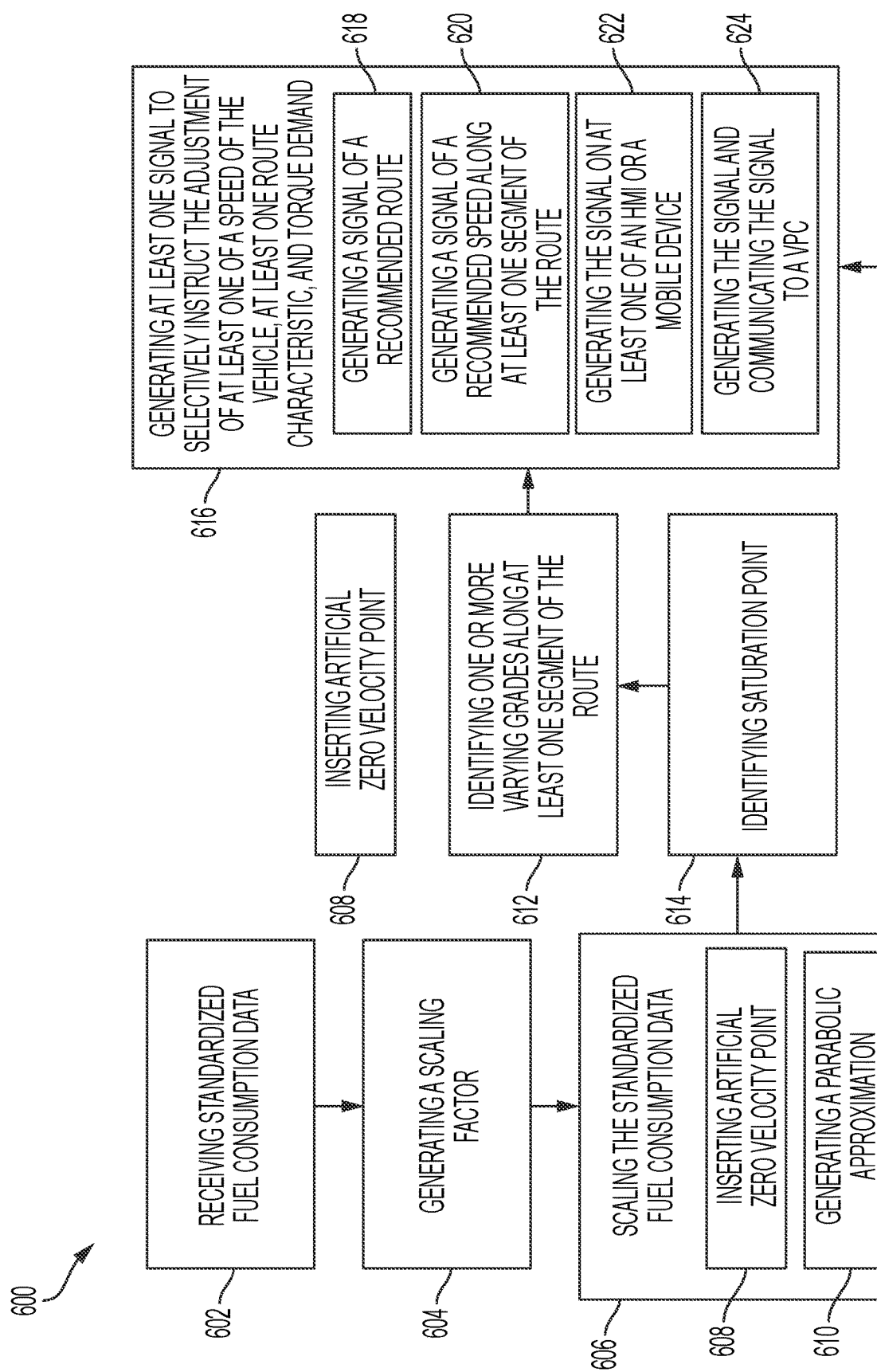
FIG. 6 is a flow diagram generally illustrating an alternative energy consumption estimation method according to the principles of the present disclosure.

FIG. 6 is a flow diagram generally illustrating an alternative energy consumption estimation method 600 according to the principles of the present disclosure. At 602, the method 600 receives standardized energy consumption data. For example, the PAC 124 may receive, from a remotely located computing device, standardized energy consumption data corresponding to at least one other vehicle, the standardized energy consumption data corresponding to energy consumption of the at least one other vehicle as a function of speed. The data may be configured as homologated data. At 604, the method 600 generates a scaling factor of the standardized energy consumption data. For example, the PAC 124 may generate a scaling factor by comparing the energy consumption data corresponding to the energy consumption of the vehicle as a function of speed with the standardized energy consumption data. At 606, the method 600 includes scaling the standardized energy consumption data. For example, at 607, the method 600 may generate a profile of the energy consumption efficiency of the vehicle. At 608, the method 600 may include inserting an artificial zero velocity point to have three distinct standardized energy consumption data reference points. At 610, the method 600 may include generating a parabolic approximation of energy consumption using the three distinct standardized energy consumption data reference points. After step 606, the method 600 may continue at either step 612 or 616.

At 612, the method 600 may include identifying, with the energy consumption of the vehicle, a saturation point of energy conservation, the saturation point corresponding to a speed above threshold wherein the energy efficiency diverges from the parabolic approximation. At 614, the method 600 may include identifying at least one or more varying grades along at least one segment of a route and modifying the profile of the energy consumption efficiency by a coefficient of the at least one other vehicle. At 616, the method 600 may include generating a signal to selectively instruct the adjustment of at least one of a speed of the vehicle, at least one route characteristic of a portion of a route being traversed by the vehicle, and a torque demand of the vehicle. The signal may be generated in the form of a recommendation to an operator and/or instructions to the VPC 102. At 618, the method 600 may include generating signal corresponding to a recommended route on a mobile computing device. At 620, the method 600 may include generating a signal corresponding to a recommended speed along the at least one segment of a route. For example, at 620, the recommended speed may be achieved a signal for a torque split controller signal and/or a target speed profile. In some embodiments, at 620, the method includes adjusting a vehicle speed control input based on the at least one segment of a route with a varying grade and communicating the vehicle speed control input to a vehicle propulsion controller. At 622, the method 600 may include generating the signal on at least one of an HMI 104 or mobile device. At 624, the method 600 may include generating the signal and communicating the signal directly to the VPC 102.

In some embodiments, a method for estimating energy consumption of a vehicle includes receiving from a remotely located computing device standardized energy consumption data corresponding to at least one other vehicle, the standardized energy consumption data corresponding to energy consumption of the at least one other vehicle as a function of speed. The method further includes generating a scaling factor by comparing the energy consumption data corresponding to the energy consumption of the vehicle as a function of speed with the standardized energy consumption data. The method further includes scaling the standardized energy consumption data to generate a profile of the energy consumption efficiency of the vehicle. The method further includes generating a signal to selectively adjust at least one of a speed of the vehicle, at least one route characteristic of a portion of a route being traversed by the vehicle, and a torque demand of the vehicle.

In some embodiments, scaling the standardized energy consumption data includes inserting an artificial zero velocity point to have three distinct standardized energy consumption data reference points. In some embodiments, generating the profile of the energy consumption efficiency of the vehicle includes generating a parabolic approximation of energy consumption using the three distinct standardized energy consumption data reference points. In some embodiments, generating the profile of the energy consumption efficiency of the vehicle includes identifying, with the energy consumption of the vehicle, a saturation point of energy conservation, the saturation point corresponding to a speed above threshold wherein the energy efficiency diverges from the parabolic approximation.

In some embodiments, generating the profile of the energy consumption efficiency of the vehicle includes identifying at least one or more varying grades along at least one segment of a route and modifying the profile of the energy consumption efficiency by a coefficient of the at least one other vehicle. In some embodiments, generating a signal to selectively adjust of the at least one route characteristic of a portion of a route being traversed by the vehicle includes generating signal corresponding to a recommended route on a mobile computing device. In some embodiments, generating a signal to selectively adjust the at least one route characteristic of a portion of a route being traversed by the vehicle includes generating a signal corresponding to a recommended speed along the at least one segment of a route. In some embodiments, generating a signal corresponding to a recommended speed along the at least one segment of a route includes adjusting a vehicle speed control input based on the at least one segment of a route with a varying grade and communicating the vehicle speed control input to a vehicle propulsion controller. In some embodiments, generating a signal to selectively adjust the speed of the vehicle includes generating a signal corresponding the speed of the vehicle to at least one segment of the route being traversed by the vehicle on a mobile computing device.

In some embodiments, an apparatus for estimating energy consumption of a vehicle includes a memory and a processor. The memory includes instructions executable by the processor to: receive from a remotely located computing device standardized energy consumption data corresponding to at least one other vehicle, the standardized energy consumption data corresponding to energy consumption of the at least one other vehicle as a function of speed; generate a scaling factor by comparing the energy consumption data corresponding to the energy consumption of the vehicle as a function of speed with the standardized energy consumption data; scale the standardized energy consumption data to generate a profile of the energy consumption efficiency of the vehicle; and generate a signal to selectively adjust at least one of a speed of the vehicle, at least one route characteristic of a portion of a route being traversed by the vehicle, and a torque demand of the vehicle.

In some embodiments, generating the profile of the energy consumption efficiency of the vehicle includes identifying at least one or more varying grades along at least one segment of a route and modifying the profile of the energy consumption efficiency by a coefficient of the at least one other vehicle. In some embodiments, generating a signal to selectively adjust the at least one route characteristic of a portion of a route being traversed by the vehicle includes generating signal corresponding to a recommended route on a mobile computing device. In some embodiments, generating a signal to selectively adjust the at least one route characteristic of a portion of a route being traversed by the vehicle includes generating a signal corresponding to a recommended speed along the at least one segment of a route. In some embodiments, generating a signal corresponding to a recommended speed along the at least one segment of a route includes adjusting a vehicle speed control input based on the at least one segment of a route with a varying grade and communicating the vehicle speed control input to a vehicle propulsion controller. In some embodiments, generating a signal to selectively adjust the speed of the vehicle includes generating a signal corresponding the speed of the vehicle to at least one segment of the route being traversed by the vehicle on a mobile computing device.

In some embodiments, a non-transitory computer-readable storage medium includes executable instructions that, when executed by a processor, facilitate performance of operations, comprising: receiving from a remotely located computing device standardized energy consumption data corresponding to at least one other vehicle, the standardized energy consumption data corresponding to energy consumption of the at least one other vehicle as a function of speed; generating a scaling factor by comparing the energy consumption data corresponding to the energy consumption of the vehicle as a function of speed with the standardized energy consumption data; scaling the standardized energy consumption data to generate a profile of the energy consumption efficiency of the vehicle; and generating a signal to selectively adjust at least one of a speed of the vehicle, at least one route characteristic of a portion of a route being traversed by the vehicle, and a torque demand of the vehicle.

In some embodiments, the standardized energy consumption data corresponding to at least one other vehicle includes homologation data corresponding to a plurality of vehicles.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for estimating energy consumption of a vehicle, the method comprising:
   receiving, from a remotely located computing device, standardized energy consumption data corresponding to at least one other vehicle, the standardized energy consumption data corresponding to energy consumption of the at least one other vehicle as a function of speed;
   generating a scaling factor by comparing the energy consumption data corresponding to the energy consumption of the vehicle as a function of speed with the standardized energy consumption data;
   scaling the standardized energy consumption data;
   generating a profile of energy consumption efficiency of the vehicle based on the scaled standardized energy consumption data, a parabolic approximation of the energy consumption efficiency, and homologation data corresponding to a plurality of vehicles, wherein generating the profile of the energy consumption efficiency of the vehicle includes: identifying, with the energy consumption of the vehicle, a saturation point of energy conservation, the saturation point corresponding to a speed above threshold wherein energy efficiency diverges from the parabolic approximation; and identifying at least one or more varying grades along at least one segment of a route and modifying the profile of the energy consumption efficiency by a coefficient of the at least one other vehicle;
   generating a signal to selectively adjust at least one of a speed of the vehicle, and a torque demand of the vehicle based on the profile of energy consumption efficiency of the vehicle; and
   generating a correction factor comprising a zero offset value wherein generating the parabolic approximation includes using the correction factor to relocate a zero velocity point on a corresponding parabolic line.

2. The method of claim 1, wherein generating the signal further includes generating a signal corresponding to a recommended route on a mobile computing device.

3. The method of claim 1, wherein generating the signal further includes generating a signal corresponding to a recommended speed along the at least one segment of a route.

4. The method of claim 3, wherein generating the signal corresponding to a recommended speed along the at least one segment of a route includes adjusting a vehicle speed control input based on the at least one segment of a route with a varying grade and communicating the vehicle speed control input to a vehicle propulsion controller.

5. The method of claim 1, wherein generating the signal to selectively adjust the speed of the vehicle includes generating a signal corresponding the speed of the vehicle to at least one segment of the route being traversed by the vehicle on a mobile computing device.

6. An apparatus for estimating energy consumption of a vehicle comprising:
   a memory; and
   a processor, wherein the memory includes instructions executable by the processor to:
      receive, from a remotely located computing device, standardized energy consumption data corresponding to at least one other vehicle, the standardized energy consumption data corresponding to energy consumption of the at least one other vehicle as a function of speed;
      generate a scaling factor by comparing the energy consumption data corresponding to the energy consumption of the vehicle as a function of speed with the standardized energy consumption data;
      scale the standardized energy consumption data;
      generate a profile of energy consumption efficiency of the vehicle based on the scaled standardized energy consumption data, a parabolic approximation of the energy consumption efficiency, and homologation data corresponding to a plurality of vehicles, wherein generating the profile of the energy consumption efficiency of the vehicle includes: identifying. with the energy consumption of the vehicle, a saturation point of energy conservation, the saturation point corresponding to a speed above threshold wherein energy efficiency diverges from the parabolic approximation; and identifying at least one or more varying grades along at least one segment of a route and modifying the profile of the energy consumption efficiency by a coefficient of the at least one other vehicle;
      generate a signal to selectively adjust at least one of a speed of the vehicle, and a torque demand of the vehicle based on the profile of energy consumption efficiency of the vehicle; and
      generate a correction factor comprising a zero offset value, wherein generating the parabolic approximation includes using the correction factor to relocate a zero velocity point on a corresponding parabolic line.

7. The apparatus of claim 6, wherein generating the signal includes generating a signal corresponding to a recommended route on a mobile computing device.

8. The apparatus of claim 6, wherein generating the signal includes generating a signal corresponding to a recommended speed along the at least one segment of a route.

9. The apparatus of claim 8, wherein generating the signal further includes adjusting a vehicle speed control input based on the at least one segment of a route with a varying grade and communicating the vehicle speed control input to a vehicle propulsion controller.

10. The apparatus of claim 6, wherein generating the signal to selectively adjust the speed of the vehicle includes generating a signal corresponding the speed of the vehicle to at least one segment of the route being traversed by the vehicle on a mobile computing device.

11. A non-transitory computer-readable storage medium, comprising executable instructions that, when executed by a processor, facilitate performance of operations, comprising:
  receiving, from a remotely located computing device, standardized energy consumption data corresponding to at least one other vehicle, the standardized energy consumption data corresponding to energy consumption of the at least one other vehicle as a function of speed;
  generating a scaling factor by comparing the energy consumption data corresponding to the energy consumption of the vehicle as a function of speed with the standardized energy consumption data;
  scaling the standardized energy consumption data;
  generating a profile of energy consumption efficiency of the vehicle based on the scaled standardized energy consumption data, a parabolic approximation of the energy consumption efficiency, and homologation data corresponding to a plurality of vehicles, wherein generating the profile of the energy consumption efficiency of the vehicle includes: identifying, with the energy consumption of the vehicle, a saturation point of energy conservation, the saturation point corresponding to a speed above threshold wherein energy efficiency diverges from the parabolic approximation; and identifying at least one or more varying grades along at least one segment of a route and modifying the profile of the energy consumption efficiency by a coefficient of the at least one other vehicle;
generating a signal to selectively adjust at least one of a speed of the vehicle, and a torque demand of the vehicle based on the profile of energy consumption efficiency of the vehicle; and
generating a correction factor comprising a zero offset value, wherein generating the parabolic approximation includes using the correction factor to relocate a zero velocity point on a corresponding parabolic line.

* * * * *